United States Patent
Hoolhorst et al.

(10) Patent No.: US 6,210,233 B1
(45) Date of Patent: *Apr. 3, 2001

(54) CARD READING DEVICE HAVING MULTIPLE STACKED AND OFFSET CARD RECEIVING POSITIONS

(75) Inventors: Albert Hoolhorst, Be Aardenburg (NL); Per-Hakan Persson, Kaevlinge (SE)

(73) Assignee: Tyco Electronics Logistics AG, Steinach (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/336,957

(22) Filed: Jun. 21, 1999

Related U.S. Application Data

(63) Continuation of application No. PCT/EP97/07203, filed on Dec. 19, 1997.

(30) Foreign Application Priority Data

Dec. 20, 1996 (DE) .............................................. 196 53 599

(51) Int. Cl.$^7$ ...................................................... H01R 24/00
(52) U.S. Cl. .......................................... 439/630; 439/326
(58) Field of Search ..................................... 439/630, 326, 439/61, 62, 267, 260, 325, 331; 235/441, 492, 487

(56) References Cited

U.S. PATENT DOCUMENTS 5,103,378 * 4/1992 Stowers ................................... 439/61
5,259,784 11/1993 Iwatare et al. ........................ 439/377

FOREIGN PATENT DOCUMENTS

19523793C1 11/1996 (DE) .

* cited by examiner

*Primary Examiner*—Neil Abrams
*Assistant Examiner*—Javaid Nasri
(74) *Attorney, Agent, or Firm*—Herbert L. Lerner; Laurence A. Greenberg; Werner H. Stemer

(57) ABSTRACT

A card reading device is characterized thereby that it is constructed for reading laterally offset cards lying one above the other. This enables a simple and compact structure to be achieved for the card reading device.

16 Claims, 5 Drawing Sheets

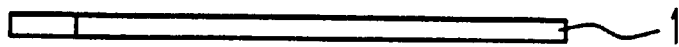
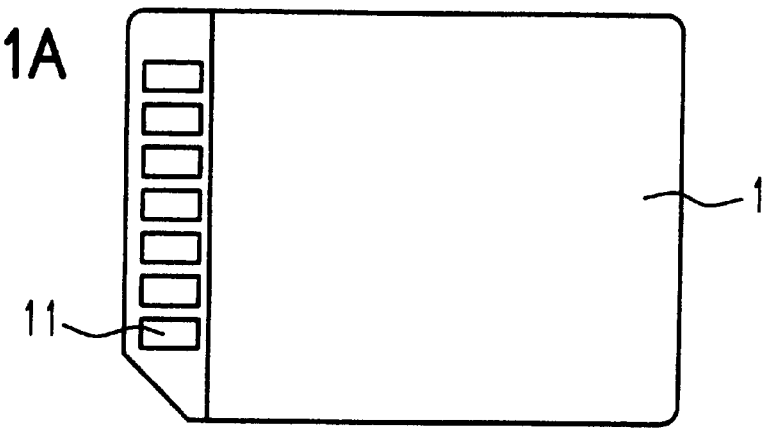
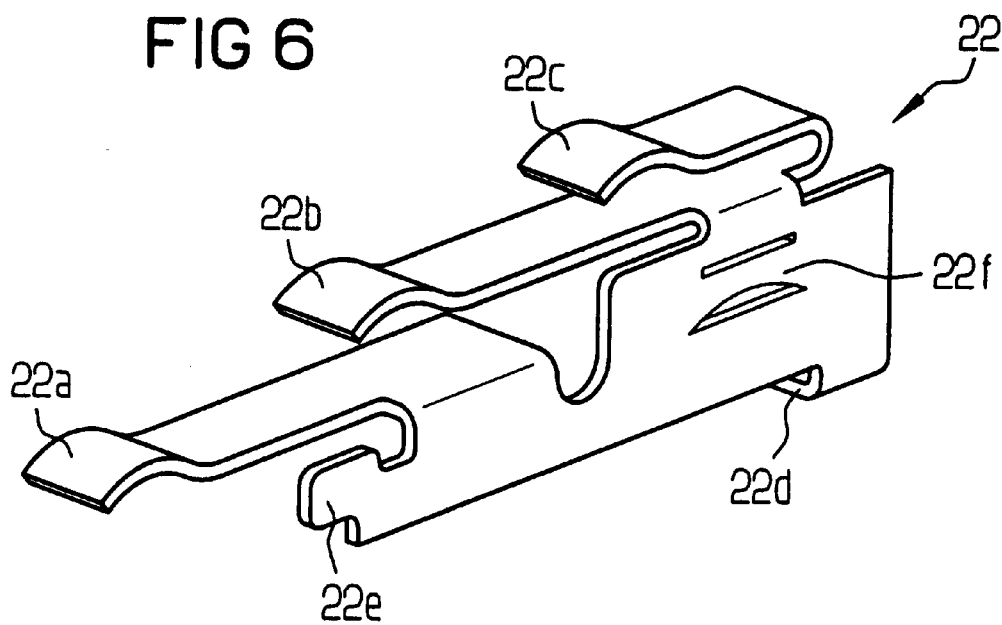

CARD READING DEVICE HAVING MULTIPLE STACKED AND OFFSET CARD RECEIVING POSITIONS

CROSS-REFERENCE TO RELATED APPLICATION

This application is a continuation of International Application No. PCT/EP97/07203, filed Dec. 19, 1997, which designated the United States.

BACKGROUND OF THE INVENTION

Field of the Invention

This invention concerns a card reading device.

Examples of (but by no means all) card reading devices are the reading devices in mobile telephones for accepting and/or passing on information provided through or for a chip card or a SIM card.

Chip cards and SIM cards are used in mobile telephones primarily for subscriber identification; the structure and function of the chip cards and the SIM cards are generally known and require no further explanation.

Card reading devices are obviously not restricted to use with the chip cards and the SIM cards but can also be used in principle for reading any other cards.

This applies, among other things, for the so-called MM cards, which are currently under development and which will be used in the near future as storage media, or more precisely as mass storage, in semiconductor technology in a wide range of different electronic devices. "MM" is the abbreviation for "multimedia" and thereby serves to express the diversity of applications of MM cards. Although currently available MM cards have a storage capacity of 64 Mbit, storage capacities in the Gbit range are already being regarded as realistic.

Because of the small size of MM cards (most MM cards have a size between that of the SIM cards and that of the chip cards) and the fact that the reading devices for such cards can also be very small (there is no need for motors, moveable reading heads or similar), the use of MM cards in mobile telephones is also conceivable. For example, MM cards could be used in mobile telephones for storing telephone directories, speech (answering-machine function), fax messages, software and similar.

On the other hand, mobile telephones and also many other devices in which MM cards could be used have only very limited space available for the installation of additional card reading devices. A further problem is that changing the cards that must be read must be quick and simple, and that the card reading device should preferably be configured to accept several cards at once.

SUMMARY OF THE INVENTION

It is accordingly an object of the invention to provide a card reading device which overcomes the above-mentioned disadvantages of the prior art methods and devices of this general type.

With the foregoing and other objects in view there is provided, in accordance with the invention, a card reading device, including: a card containing part constructed for reading laterally offset cards lying one above each other; and an openable lid disposed on the card containing part, the lid in an opened state allowing insertion of the cards which must be read into the card containing part and in a closed state the lid retaining the cards in the card containing part in their proper position.

The invention at hand therefore has the purpose of disclosing a card reading device applicable for reading several cards simultaneously, the size of which card reading device can be kept to a minimum.

The characteristic provides that the card reading device is constructed for reading cards that are lying laterally offset one above the other.

This kind of construction of the card reading device allows contact to be made with several cards in an especially simple, elegant and space-saving manner. Thus, for example, the several contact-element groups of the card reading device, which groups are provided for making contact with the several cards, can be disposed on a stepped contact-element section of the card reading device, which configuration is associated with several advantages. First, a conceptually simple mechanical construction of the card reading device is possible. Second, the contact-elements of the card reading device can be very easily connected together (in parallel) because of their physical closeness, or be combined into multiple contact-elements for making contact with the contact positions of different cards.

The simple mechanical construction of the card reading device, the simple connectability and/or combinability of the contact-elements of the card reading device, and the capability of stacking the cards which must be read immediately above one another (without intervening spaces) enables optimal utilization of the available space. In other words, the construction of card reading devices which are only slightly larger than the actual cards which must be read.

Thus a card reading device was found whose size is minimal.

Other features which are considered as characteristic for the invention are set forth in the appended claims.

Although the invention is illustrated and described herein as embodied in a card reading device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1A is a diagrammatic, top plan view of an MM card;

FIG. 1B is a side-elevational view of the MM card;

FIG. 6 is a perspective view of a multiple contact-element of the card reading device;

DESCRIPTION OF THE PREFERRED EMBODIMENTS

Figure 2A:
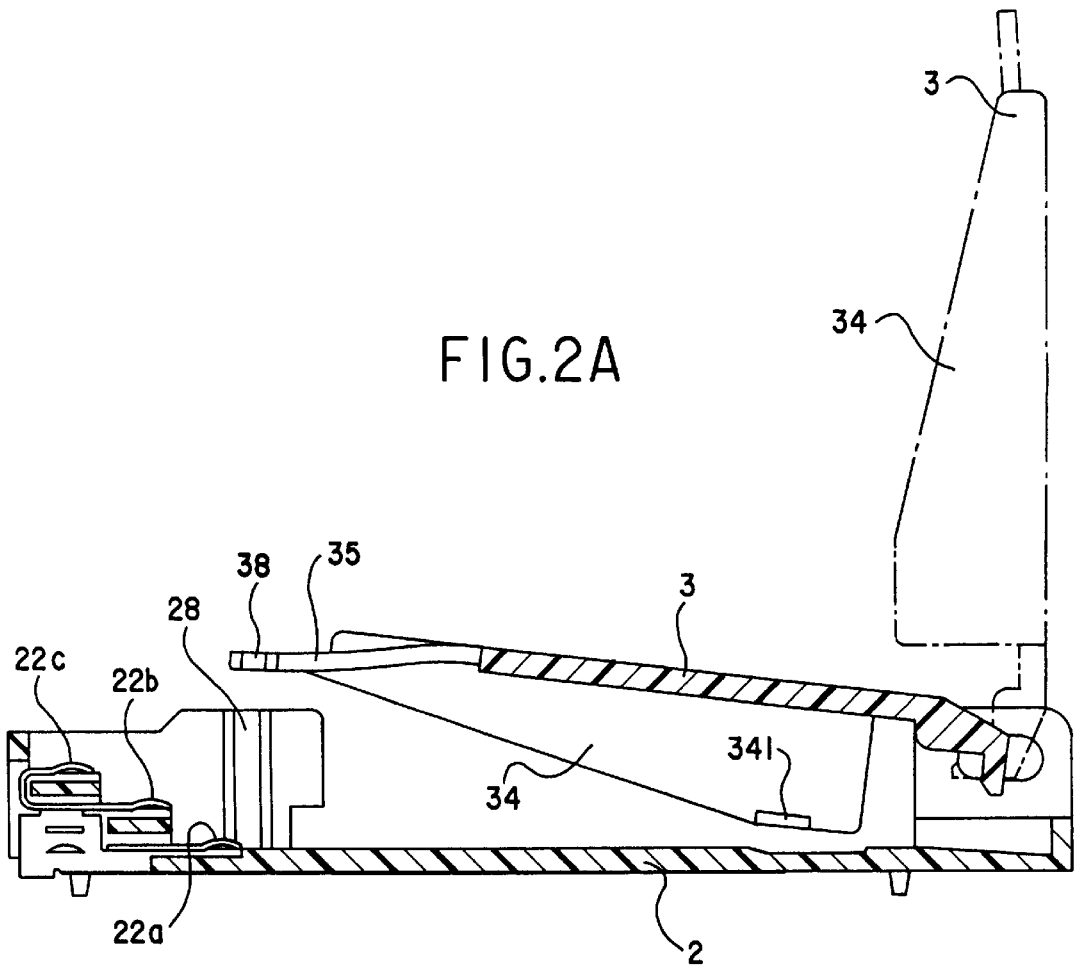
FIG. 2A is a cross-sectional view through a card reading device with a completely and partially opened lid.

In all the figures of the drawing, sub-features and integral parts that correspond to one another bear the same reference symbol in each case. Referring now to the figures of the drawing in detail and first, particularly, to FIG. 1*a* thereof, there is shown an MM card 1 to be read by a card reading device configured for reading MM cards 1. This does not mean, however, that the invention is restricted to card reading devices configured specifically for this purpose. The card reading device is also applicable to the reading of any other kinds of cards (e.g. "normal" chip cards, SIM cards and similar), whereby the cards can have not only any kind of function but can also have arbitrary dimensions.

FIG. 1A illustrates a top view of the MM card 1, for the reading of which the card reading device described in greater detail below is suitable, and FIG. 1B shows a side view of the MM card 1. As can be seen in the above figures, the illustrated MM card 1 has contact areas in the form of a row of surface contacts 11 on its upper surface near its edge. The surface contacts 11 of the MM card 1 must be contacted by the card reading device, i.e. more precisely by contact-elements of the card reading device.

The MM card 1 considered in this example of realization has a length of 32 mm, a width of 24 mm and a thickness of between 1.3 and 1.4 mm.

The card reading device here being considered is a card reading device capable of being operated from above, as will be described in detail below with reference to FIGS. 2*a* to 8.

As is visible in particular from FIGS. 2*a*, 2*b* and 3*a*, 3*b*, the card reading device under consideration contains a contact and card-containing part 2 and a lid 3 attached to the part 2 in a manner enabling the lid 3 to swivel.

As already indicated by its name, the contact and card-containing part 2 contains the above-mentioned contact-elements and serves to accept and make contact with several of the MM cards 1, whereby several refers to up to 3 MM cards 1 in this example of realization under consideration.

The lid 3 serves in particular to hold the MM cards 1 in their specified (read) position.

Figure 3A:
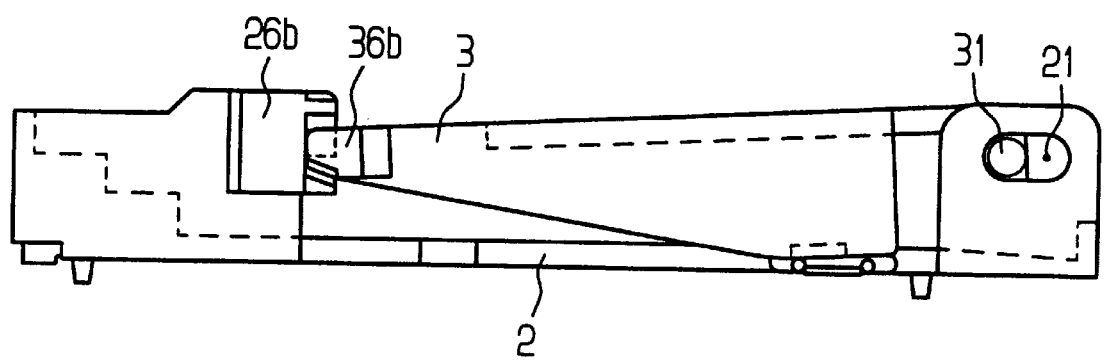
FIG. 3A is a side-elevational view of the card reading device with the lid closed as far as a second closed position.
Figure 3B:
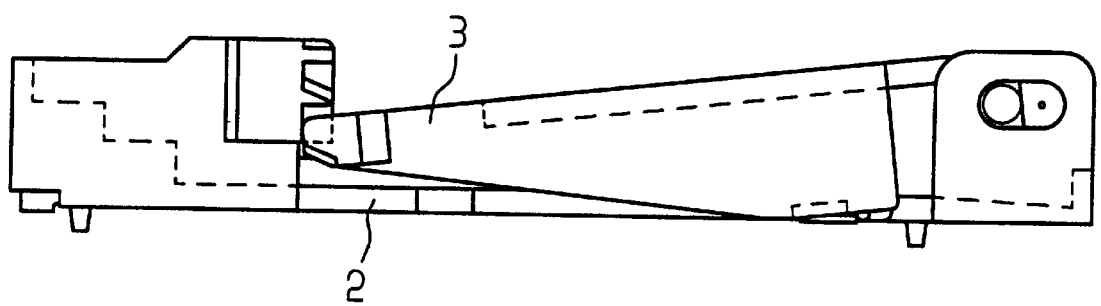
FIG. 3B is a side-elevational view of the card reading device with the lid closed as far as a third closed position.
Figure 5:
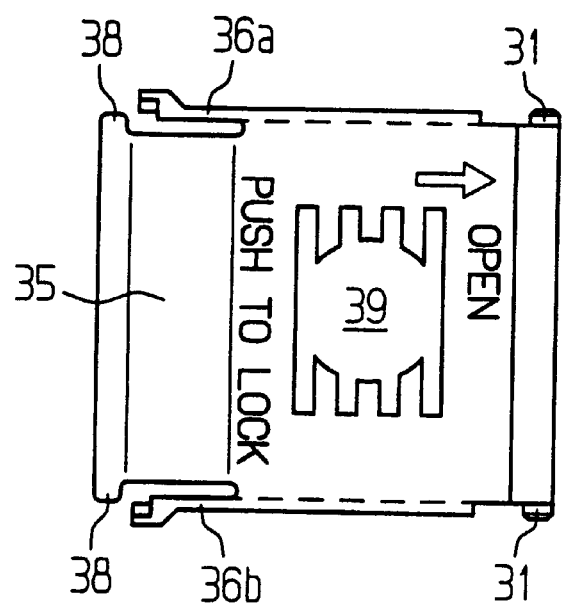
FIG. 5 is a top plan view of the lid of the card reading device in accordance with FIGS. 2 and 3.

As is visible in particular from a top view of the lid 3 illustrated in FIG. 5 and a side view of the card reading device illustrated in FIGS. 3*a*, 3*b*, the lid 3 has pegs 31, which fit into slots 21 of the contact and card-containing part 2 when the lid 3 is combined with the contact and card-containing part 2. The lid 3 can be opened and shut through swivelling it about the pegs 31.

FIG. 2A illustrates a completely open position of the lid 3 and an only partially opened position of the lid 3. The lid in the completely open position is indicated by broken lines. When the lid 3 is completely open, up to three of the MM cards 1 can be inserted into the card reading device from above.

Figure 2B:
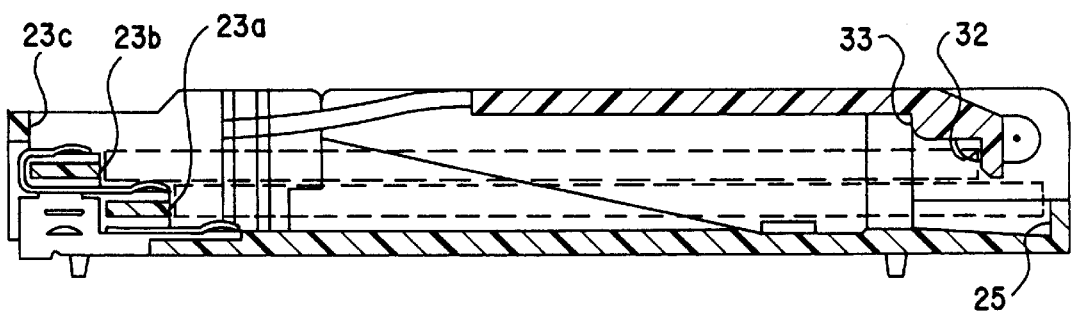
FIG. 2B is a cross-sectional view through the card reading device with the lid closed as far as a first closed position.

The lid 3 can engage in several positions with the contact—and card-containing part 2. FIG. 2B illustrates the specified engagement position of the lid 3 when the contact and card-containing part contains three of the MM cards 1. For example, two cards inserted in the two lowermost positions are illustrated in FIG. 2B in dashed lines. FIG. 3A illustrates the specified engagement position of the lid 3 when the contact and card-containing part 2 contains two of the MM cards 1. FIG. 3B illustrates the specified engagement position of the lid 3 when the contact and card-containing part 2 contains only one MM card 1. The method of engagement and locking between the contact and card-containing part 2 and the lid 3 are described in greater detail below.

As already mentioned above, the contact and card-containing part 2 contains the contact-elements for making contact with the surface contacts 11 of the MM card 1. The contact-elements are designated in the figures with the reference numbers 22*a*, 22*b* and 22*c*.

Figure 4:
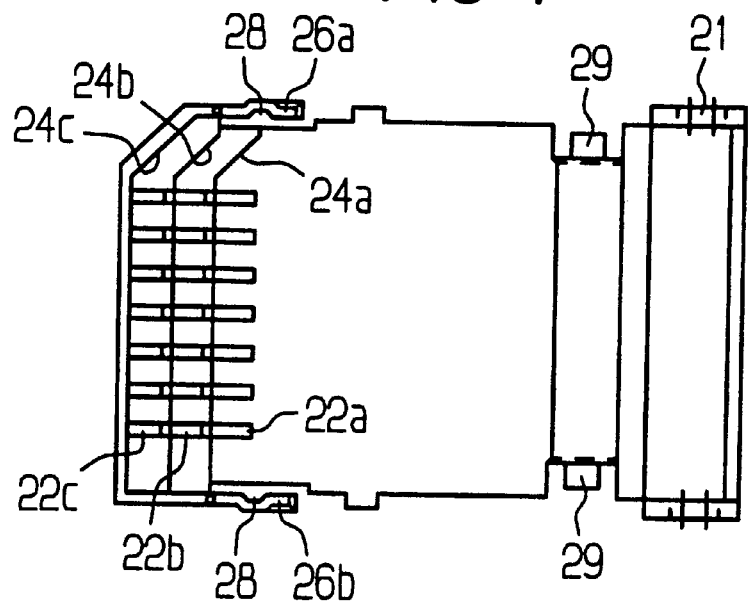
FIG. 4 is a top plan view of a contact and card-containing part of the card reading device in accordance with FIGS. 2 and 3.

As is particularly visible in the top view of the contact and card-containing part 2 shown in FIG. 4, three adjacent rows of the contact-elements 22*a*–22*c* are provided, whereby a first (right-hand as displayed in FIG. 4) row of the contact-elements formed from several of the contact-elements 22*a* is laid out to make contact with a first MM card 1. A second (central as displayed in FIG. 4) row of contact-elements formed from several of the contact-elements 22*b* is laid out to make contact with a second MM card 1, and a third (left-hand as displayed in FIG. 4) row of contact-elements formed from several of the contact-elements 22*c* is laid out to make contact with a third MM card 1.

As can be seen particularly in FIGS. 2*a*, 2*b*, the rows of contact-elements 22*a*–22*c* are disposed at different heights in a stepped contact-element section of the contact and card-containing part 2. Whereby the first (right-hand) row of contact-elements 22*a* lies at the lowest level, the second (middle) row of contact-elements 22*b* lies at the middle level, and the third (left-hand) row of contact-elements 22*c* lies at the highest level. The respective height differences between the levels (step heights) correspond approximately to the thickness of the MM card 1. The separation between adjacent rows of contact-elements 22*a*–22*c* (step depth) corresponds approximately to the distance by which two MM cards 1 disposed one above the other must be laterally offset in order to ensure that their surface contacts 11 are freely accessible (i.e. the surface contacts 11 of the MM card 1 are not covered by another MM card 1 located above or below the MM card 1). In the example being considered the offset is relatively small because the surface contacts 11 of the MM card 1 being considered are disposed near the edge of the MM card 1.

The rows of contact-elements 22*a*–22*c* are separated positionally and functionally in order to allow contact to be made simultaneously with several contact-element groups suitable for MM cards 1.

The fact that the contact-elements 22*a*–22*c* for all the cards 1 that must be read are locally concentrated in the relatively small-dimensioned contact-element section allows for especially simple connection of the contact-elements 22*a*–2*c* both among each other and to connection elements for connection to an external circuit.

In the event that mutually corresponding contact-elements 22*a*–22*c* of the respective rows of contact-elements 22*a*–22*c* must be connected in parallel, it is possible to dispose those contact-elements to be connected in parallel are, at least partially, combined to multiple contact-elements.

A multiple contact-element 22 of this kind is illustrated in FIG. 6. By the multiple contact-element 22 shown, the three contact-elements 22*a*–22*c* are simultaneously combined, namely the contact-element 22*a* of the first (lowest) row of contact-elements, the contact-element 22*b* of the second (middle) row of contact-elements and the contact-element 22c of the third (highest) row of contact-elements. Generally speaking, a multiple contact-element 22 configured as shown enables in particular the combination of mutually corresponding (adjacently disposed according to the illustration in FIG. 4) contact-elements of a single row or of all rows of contact-elements to form a single multiple contact-element.

The multiple contact-element 22 shown in FIG. 6 is preferably stamped out of sheet metal and then bent into the required shape. The shape of the stamped out sheet metal part and the bending of same can be deduced on the basis of the illustration in FIG. 6 and need not be described in greater detail. The manufacture of the second contact-element 22b and of the third contact-element 22c are, however, are worthy of note. These are first bent as a combined unit through 90° in a first bending direction (towards the back according to the illustration in FIG. 6) and then the third contact-element 22c is bent alone through 180° in a second bending direction perpendicular to the first bending direction (to the left according to the illustration in FIG. 6), whereby it comes to rest as shown laterally offset above the second contact-element 22b. Through this method of manufacture of the second and third contact-elements 22b and 22c, the size of the multiple contact-element 22, which is already intrinsically capable of being made very small as a result of combining several contact-elements 22a–22c, can be reduced still further and the production of the multiple contact-element 22 can be mastered without problems. At the same time, material consumption is reduced as a result of being able to minimize the size of the stamped metal parts.

In addition to the contact-elements 22a, 22b and 22c, the multiple contact-element 22 also has an extension bent to a soldering lug 22d, an extension which can be used as a centering element 22e, and an embossment 22f.

The soldering lug 22d serves for soldering to appropriate connection positions of a printed circuit board (or similar) not shown in the figures, whereby the card reading device is also fixed indirectly to the printed circuit board (in the example being considered two further soldering lugs 29 are provided at the underside of the contact and card-containing part 2 for additionally fixing the card reading device to the printed circuit board). The integration of the soldering lug 22d in the multiple contact-element 22 renders superfluous any separate connections between soldering lugs and contact-elements and also contributes towards a reduction in the number of individual parts which must be assembled in order to build the card reading device.

The centering element 22e and the embossment 22f serve for the proper installation and fixing of the multiple contact-element 22 in the contact and card-containing part 2.

It is almost certainly self-evident that the contact-element section described above is adaptable in respect of many different aspects. Thus it is not absolutely necessary, for example, that the contact-elements 22a–22c are disposed adjacently in rows as described. The selected configuration of the contact-elements 22a–22c can—in fact obviously must—be adapted primarily to the configuration of the contact positions to be made contact with on the respective MM cards 1 which must be read, and/or to any other prevailing circumstances and requirements. In the event that contact must be made with contactless cards, the contact-element section can be fitted with appropriate antennae additionally or alternatively to the contact-elements described above. It is also not essential that the contact-element section be located in the contact and card-containing part 2; instead, it can be completely or partly integrated in the lid 3.

The contact-element section constructed as described above or similarly renders it possible to make proper contact with several MM cards 1 that are stacked one above the other (preferably without any intervening space) and laterally staggered.

When the lid 3 is opened appropriately, the MM cards 1 can be easily inserted in the card reading device from above (laid one above the other with the appropriate lateral offset).

When the MM cards 1 have been properly inserted the surface contacts 11 of the first (lowest) of the MM cards 1 comes to lie on the contact-elements 22a of the first (lowest) row of contact-elements, the surface contacts 11 of the second (middle) of the MM cards 1 comes to rest on the contact-elements 22b of the second (middle) row of contact-elements and the surface contacts 11 of the third (topmost) of the MM cards 1 comes to rest on the contact-elements of the third (topmost) row of contact-elements.

In order to ensure that the surface contacts 11 of the MM cards 1 make proper contact with the designated contact-elements 22a, 22b and 22c, there must be for insertion an exactly pre-defined and unalterable position within the contact and card-containing part 2 for the MM cards 1 that must be read, and the surface contacts 11 of the MM cards 1 must be suitably pressed against the contact-elements 22a, 22b and 22c.

In order that the MM cards 1 to be read take up and remain in exactly the required position, appropriate frame and stop structures are constructed in the contact and card-containing part 2 and in the lid 3. Through the structures, the proper position of the first (lowest) MM card 1 is defined, inter alia, through a first face 23a of the contact-element section, a first angled face 24a joined to the first face 23a, and an oppositely located rear stop face 25 of the contact and card-containing part 2. The proper position of the second (middle) MM card 1 is defined, inter alia, through a second face 23b of the contact-element section, a second angled face 24b joined to the second face 23b, and, when the lid 3 is in the closed state, an oppositely located first stop face 32 of the lid 3. The proper position of the third (topmost) MM card 1 is defined, inter alia, through a third face 23c of the contact-element section, a third angled face 24c joined to the third face 23c, and, when the lid 3 is in the closed state, an oppositely located second stop face 33 of said lid. An additional lateral retention of the MM cards 1 inside the contact and card-containing part 2 is realized in particular by mutually opposite lateral aprons 34 of the lid 3, which aprons 34 project downwards when the lid 3 is in the closed state.

In order to enable the MM cards 1 in the contact and card-containing part 2, more precisely the surface contacts 11 of the MM cards, to be pressed down on the contact-elements 22a, 22b and 22c, a free (front) end section 35 of the lid 3 is angled downwards by a few degrees and constructed to be resilient. When the lid is in the closed state the end section 35 presses on the MM card(s) in the contact and card-containing part 2.

In order to render the force pressing down the MM card(s) 1 independent of the number of MM cards 1 located in the contact and card-containing part 2, the lid 3 and the contact and card-containing part 2 can engage in one another in different relative positions. The engaging elements of the contact and card-containing part 2 are attached to resilient guiding and locking-arms 26a and 26b, which in the example under consideration run parallel to one another on opposite sides of the contact and card-containing part 2, as shown in the figures. The engaging elements of the lid 3 are also attached to resilient locking-arms 36a and 36b, which in the example under consideration run parallel on opposite sides of the lid 3 with a separation to the free end section of the lid 3.

Figure 7:
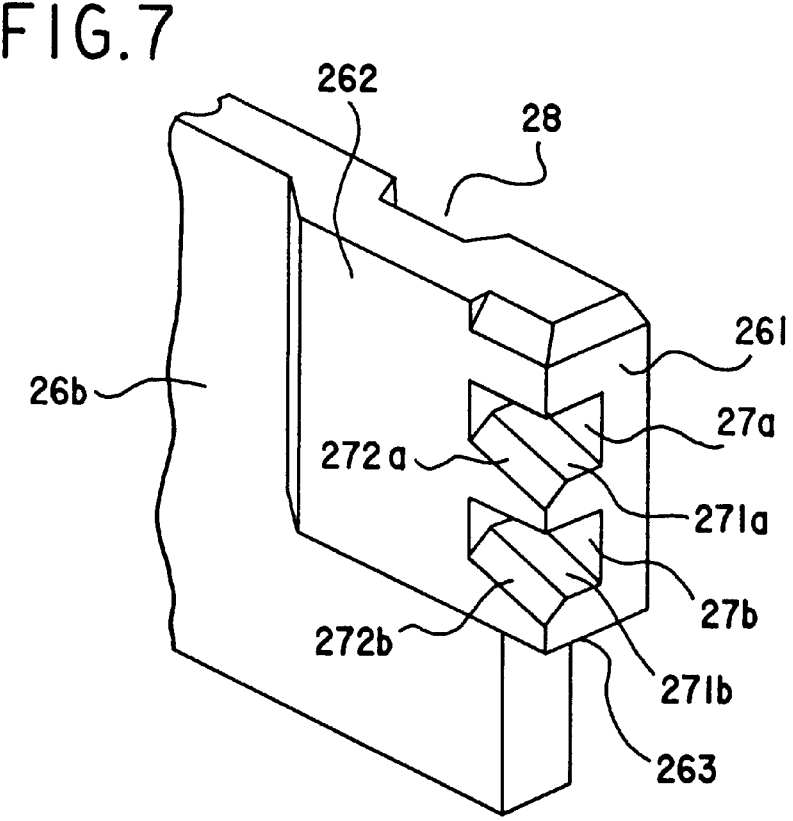
FIG. 7 is a perspective view of a guiding and locking-arm of the contact and card-containing part.

The engaging elements of the contact and card-containing part 2 are shown in FIG. 7. FIG. 7 illustrates engaging recesses 27a and 27b disposed one above the other in the free end sections of the guiding and locking-arms 26a and 26b, which recesses extend from a face side 261 of the guiding and locking-arms 26a and 26b a certain distance along outer sides 262 (facing away from each other) of the guiding and locking-arms, and whose lower limiting faces 271a and 271b contain bevels 272a and 272b and are shaped to slope downwards towards the face side.

Figure 8:
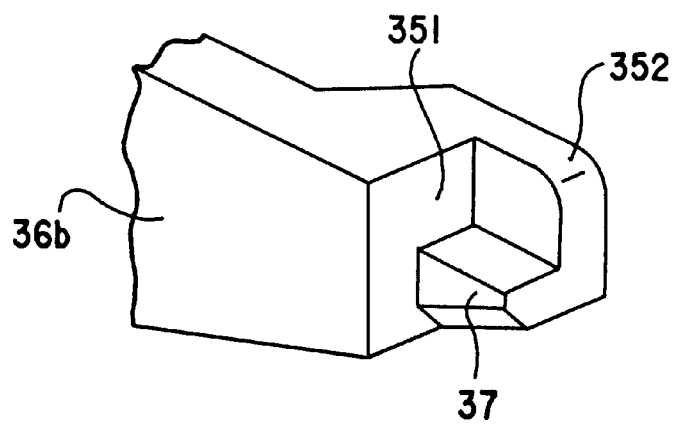
FIG. 8 is a perspective view of the locking arm of the lid.

The engaging elements of the lid 3 are shown in FIG. 8. This illustrates engaging noses 37, which are provided on the free end sections of the locking-arms 36a and 36b (one engaging nose per locking arm). The engaging noses 37 are adapted to the shape of the engaging recesses 27a and 27b, project from a face side 351 of the locking-arms 36a and 36b and each of which engaging nose 37 is strengthened by a reinforcing element 352.

The contact and card-containing part 2 and the lid 3 are also provided with guiding elements, which while the lid 3 is being shut engage even before the lid 3 engages with the contact and card-containing part 2. The guiding elements of the contact and card-containing part 2 consist of vertically running guiding grooves 28 with gently sloping sides, which grooves are located on the sides facing towards each other of the guiding and locking-arms 26a and 26b. The guiding elements of the lid 3 consist of the guide pins 38 provided on the sides facing away from each other of the free end section 35.

When the lid 3 is being closed, the first event is that guide pins 38 provided on the free end section 35 enter the guide grooves 28 of the contact and card-containing part 2 and are retained and guided in the grooves 28 during the further shutting process and while the device is in the closed state. Next, the engaging noses 37 of the locking-arms 36a and 36b of the lid 3 reach the guiding and locking-arms 26a and 26b of the contact and card-containing part 2. The engaging noses 37 slide along the outsides of the guiding and locking-arms 26a and 26b of the contact and card-containing part 2, pressing together the guiding and locking-arms and/or spreading apart the locking-arms 36a and 36b of the lid 3, until they finally snap into the upper engaging recesses 27a. In this state the lid has attained the position which it must adopt for the case that three of the MM cards 1 are inserted in the contact and card-containing part 2. If an attempt is made to press the lid 3 down further, the lid 3 strikes the stack of cards 1. The free resilient end section 35 of the lid 3 exerts pressure on the stack of cards 1 and thereby ensures that each MM card 1 is suitably pressed onto the designated contact-elements.

If there are only two of the MM cards 1 in the contact and card-containing part 2, the lid 3 can be pressed down as far as the next engaging recess 27b. In this case the engaging noses 37 leave the upper engaging recesses 27a, which does not require any significant application of force because of the slopes and bevels provided on engaging recesses 27a and 27b and on engaging noses 37, and slide once again along the outsides of the guiding and locking-arms 26a and 26b of the contact and card-containing part 2, pressing together the guiding and locking-arms and/or spreading apart the locking-arms 36a and 36b of the lid 3. They finally reach the lower engaging recesses 27b and snap into these. In this state the lid 3 has reached the position which it must adopt for the case that two MM cards are inserted in the contact and card-containing part 2; if an attempt is made to press the lid 3 down further, the lid 3 strikes the stack of cards. The free resilient end section 35 of the lid 3 exerts pressure on the stack of cards 1 and thereby ensures that each MM card 1 is suitably pressed onto the designated contact-elements.

If there is only one MM card 1 in the contact and card-containing part 2, the lid 3 can be pressed down still further. In this case the engaging noses 37 leave the lower engaging recesses 27b, which does not require any significant application of force because of the slopes and bevels on these and on the engaging noses, and slide once again along the outsides of the guiding and locking-arms 26a and 26b of the contact and card-containing part 2, pressing together the guiding and locking-arms and/or spreading apart the locking-arms 36a and 36b of the lid 3. They finally snap beneath a step 263 provided on the face side 261 of the guiding and locking-arms 26a. In this state the lid 3 has reached the position which it must adopt for the case that only one MM card 1 is inserted in the contact and card-containing part 2. If an attempt is made to press the lid 3 down further, the lid 3 strikes the inserted MM card 1. Here too, the free resilient end section 35 of the lid 3 exerts pressure on the MM card 1 and thereby ensures that the MM card 1 is suitably pressed onto the designated contact-elements.

Even if there is no card in the card reading device, the lid 3 cannot leave the last-described position because if the lid 3 is pressed down further the aprons 34 of the lid 3 strike the floor of the contact and card-containing part 2.

Alternatively, the closing of the lid 3 can also be reversed in order to open the lid as described in the following.

In order to release the engagement between the lid 3 and the contact and card-containing part 2 the lid 3 must be pushed horizontally in the direction of its pegs 31. In order to enable the lid 3 to be pushed its upper face is provided with a surface structure 39 suitable for the application of force such as, for example, a hollow and or ribs running transversely to the direction of pushing. The lid 3 can be pushed because its pegs 31 are supported in slots 21 of the contact and card-containing part 2. When the lid 3 is pushed back two events take place. On the one hand, the guide pins 38 of the lid 3 move out of the guiding grooves 28 of the contact and card-containing part 2 and, on the other hand, the engaging noses 37 of the lid 3 are pulled out of the engaging recesses 27a or 27b or out of the steps 263 of the guiding and locking-arms 26a and 26b of the contact and card-containing part 2. Pushing the lid 3 back sufficiently far finally results in the release of the originally existing engagement between the contact and card-containing part 2 and the lid 3, whereby the lid 3 can be opened upwards essentially without hindrance.

When the lid 3 is opened upwards, the cards 1 inside the card reading device are carried upwards with the lid 3. This occurs because the cards are clamped between the aprons 34 of the lid 3 and/or the aprons 34 have on their lower end a projection 341 projecting inwards, which grips behind the lowest card of the stack of cards inside the card reading device and takes with it the card, together with any cards disposed above it, when the lid 3 is opened upwards.

Although the card reading device described is hardly bigger than the actual cards which must be read, it is conceivably simple to produce and amazingly easy and elegant to operate.

We claim:

1. A card reading device, comprising:

a card containing part constructed for reading laterally offset cards lying one above each other; and an openable lid disposed on said card containing part and having portions receiving the laterally offset cards, said lid in an opened state allowing insertion of the cards which must be read into said card containing part and in a closed state said lid retaining the cards in said card containing part in their proper position and pressing the cards to ensure placement in a card reading position.

2. The card reading device according to claim 1, including multiple contact-elements disposed on said card containing part and provided for making contact simultaneously with the cards lying one above the other, said multiple contact-elements formed of a stepped construction and define a contact-element section.

3. The card reading device according to claim 2, wherein said multiple contact-elements are divided into related groups of contact-elements provided for each card and said groups of contact-elements are disposed at different heights and laterally offset on said card containing part.

4. The card reading device according to claim 3, wherein a difference in height between adjacent groups of said groups of contact-elements corresponds to a thickness of the card.

5. The card reading device according to claim 4, wherein a lateral offset of said adjacent groups of said groups of contact-elements corresponds to a lateral offset with which the cards which must be read are to be disposed.

6. The card reading device according to claim 2, wherein said multiple contact-elements are electrically connected with each other and form a combined multiple contact-element.

7. The card reading device according to claim 2, wherein said lid has a resiliently constructed pressing-down element for pressing-down the cards into said card containing device when said lid is placed in said closed state.

8. The card reading device according to claim 7, wherein said lid can be engaged in multiple closed positions with said card containing part.

9. The card reading device according to claim 8, wherein said lid can be brought into various closed positions through different extents of pressing down said lid and a pressing-down process is limited by the cards disposed in said card containing part.

10. The card reading device according to claim 7, wherein an engagement between said lid and said card-containing part can be released by pushing said lid horizontally.

11. The card reading device according to claim 10, wherein said lid has lateral aprons for one of gripping behind at least a lowest one of the cards disposed in said card containing part and for clamping the at least lowest one of the cards between said lateral aprons, and when said lid is opened, said lateral aprons pushing the lowest one of the cards together with the other cards located in said card containing part.

12. A card reading device, comprising:

a card containing part having adjacently disposed card receiving regions for reading laterally offset cards, each of said card receiving regions having an end wall staggeredly disposed with respect to an end wall of an adjacent one of said card receiving regions;

contacts disposed in said card containing part and having contact elements, at least one of said contact elements exposed in at least one of said card receiving regions for contacting a respective contact element of a card when the card is placed in a respective one of said card receiving regions; and an openable lid disposed on said card containing part, said lid in an opened state allowing insertion of the cards and in a closed state said lid retaining the cards in said card containing part in their proper position and pressing the cards to ensure placement in a card reading position.

13. The card reading device according to claim 12, wherein said contacts include a plurality of contact elements.

14. The card reading device according to claim 13, wherein said plurality of contact elements is respectively exposed in said card receiving regions.

15. The card reading device according to claim 12, wherein said end wall defines a ledge and said at least one of said contact elements are disposed at said ledge.

16. The card reading device according to claim 12, wherein said lid is latchable to said card containing part in positions corresponding to said card receiving regions.

* * * * *